United States Patent [19]

Kitajima

[11] Patent Number: 5,200,608
[45] Date of Patent: Apr. 6, 1993

[54] PHOTO-INTERRUPTER OPERATING ON WIDE-RANGED POWER VOLTAGE WITH A CONSTANT CURRENT MEANS

[75] Inventor: Tomokazu Kitajima, Kawasaki, Japan

[73] Assignee: Kabushiki Kaisha Toshiba, Kawasaki, Japan

[21] Appl. No.: 753,377

[22] Filed: Aug. 30, 1991

[30] Foreign Application Priority Data

Sep. 4, 1990 [JP] Japan ............................. 2-232357

[51] Int. Cl.$^5$ .............................................. G01V 9/04
[52] U.S. Cl. ................................... 250/221; 250/222.1
[58] Field of Search ..................... 250/205, 221, 222.1, 250/214 R; 323/315, 65

[56] References Cited

U.S. PATENT DOCUMENTS

| | | | |
|---|---|---|---|
| 4,270,046 | 5/1981 | Werking | 250/205 |
| 4,730,108 | 3/1988 | Rodal et al. | 250/221 |
| 4,761,603 | 8/1988 | Nodera | 331/65 |
| 5,077,467 | 12/1991 | Barron, Jr. et al. | 250/221 |

Primary Examiner—David C. Nelms
Assistant Examiner—Que T. Le
Attorney, Agent, or Firm—Oblon, Spivak, McClelland, Maier & Neustadt

[57] ABSTRACT

An LED and a photo-diode are arranged such that they are optically coupled with each other. The first terminal to which a power supply voltage is applied is connected to the anode of the LED. Between the cathode of the LED and the second terminal for outputting an output signal, there is provided a constant current circuit for allowing a constant current to flow into the LED. To the cathode of the LED, connected is the collector of an NPN transistor, to the emitted of which the second terminal is connected. Light emitted from the LED is detected and converted into an current signal by the photo-diode. The current signal generated by the photo-diode is amplified by an amplifying circuit. A signal output from this amplifying circuit is supplied to the base of the NPN transistor, thereby controlling ON/OFF operation of the transistor. Between the second terminal and the ground point located outside the device, connected is a load resistor.

14 Claims, 3 Drawing Sheets

PHOTO-INTERRUPTER OPERATING ON WIDE-RANGED POWER VOLTAGE WITH A CONSTANT CURRENT MEANS

BACKGROUND OF THE INVENTION

1. Field of the Invention

The present invention relates to an object detector, for example, photo-interrupter in which detection of an object is carried out based on whether or not a light emitting element and a photodetector are optically coupled with each other.

2. Description of the Related Art

A photo-interrupter is a well-known example of object detectors of the above-mentioned type. Of various types of interrupters, two-terminal types are receiving much attention because of their low mounting cost.

The above-mentioned two-terminal type photo-interrupter basically includes a light emitting element, a photodetector, an amplifying circuit, a switching element, and a resistor. For example, a circuit in which a light emitting diode (LED), photo-diode, and NPN transistor are respectively employed as the light emitting element, photodetector, and switching element has the following structure.

The anode of the LED is connected to the first terminal (power terminal) to which a power supply voltage $V_{CC}$ is applied, and the resistor is connected between the cathode of the LED and the second terminal (output terminal). The collector of the above-mentioned NPN transistor is connected to the cathode of the LED, and the emitter thereof is also connected to the second terminal. The photo-diode is arranged so as to receive the light emitted from the LED, or more specifically the photo-diode is optically coupled with the LED. The anode of the photo-diode is connected to the second terminal, and the cathode thereof is connected to the input terminal of the above-mentioned amplifying circuit. Further, the first and second power supply terminals of the amplifying circuit are respectively connected to the first and second terminals so as to supply driving power thereto, and the output terminal of the amplifying circuit is connected to the base of the above-mentioned NPN transistor. The LED, photo-diode, amplifying circuit, NPN transistor, and resistor are sealed in the same package, from which the first and second terminals are lead out to serve as external terminals.

The following are descriptions of the usage and operation of the two-terminal type photo-interrupter.

To start using this photo-interrupter, a load resistor (external resistor) is connected between the second terminal and a ground GND located outside the interrupter, and a power supply voltage $V_{CC}$ is applied to the first terminal. Accordingly, the LED emits light when a driving current is supplied thereto. Then, the photo-diode carries out photo-electric conversion upon reception of light from the LED to output a current signal. The current signal thus output is amplified by the amplifying circuit, and the NPN transistor is switched ON/OFF by the amplified output thereof.

In the case where there is no object in the optical path from the LED to the photo-diode, (where light is detected), a current signal, the level of which corresponds to the amount of light received from the photo-diode, is output to the amplifying circuit, where the signal is amplified, and the amplified signal is supplied to the base of the NPN transistor. As a sufficient base current is supplied to the base of the NPN transistor, the transistor is turned on, and saturated between the collector and emitter. Where the saturated voltage between the collector and emitter, and the forward direction voltage of the LED are represented by $V_{CE}$(sat), and $V_F$, respectively, the second terminal's output voltage $V_0$ is expressed as:

$$V_0 = V_{CC} - V_F - V_{CE}(sat) \quad (1)$$

On the other hand, in the case where there is an object on the optical path from the LED to the photo-diode (where light transmitting from the LED to the photo-diode is obstructed by the object, and the light is not detected by the photo-diode), a current signal is not output from the photo-diode, thereby turning off the NPN transistor. Consequently, a current $I_F$ flowing into the LED runs out to the ground GND via the resistor and the load resistor. The output voltage $V_0$ in this case can be expressed as:

$$V_0 = (V_{CC} - V_F)/(1 + R_l/R_L) \quad (2)$$

where the resistance value of the above resistor, and that of the load resistance are represented by $R_l$ and $R_L$, respectively. Here, if each of the resistance values is selected so as to satisfy $R_l > R_L$, then the $V_0$ value obtained by equation (1) will be larger than that obtained by equation (2). This tells us that the output voltage $V_0$ in the case where there is an object between the LED and the photo-diode, differs to that in the case where there is no object. Taking advantage of this fact, whether or not there is an object between the LED and photo-diode can be detected from the change in the second terminal's output voltage $V_0$.

However, with the above-mentioned two-terminal type photo-interrupter, the range of power supply voltage $V_{CC}$ which can be used is very much limited, for the following reason.

In the case where an object exists between the LED and the photo-diode, the output voltage $V_0$ is expressed by the equation (2). In this case, a current $I_F$ flowing through the LED can be expressed as:

$$I_F = (V_{CC} - V_F)/(R_l + R_L) \quad (3)$$

The forward direction voltage $V_F$ of the LED is substantially constant; however if the range of power supply voltage $V_{CC}$ used is wide, the current $I_F$ flowing through the LED greatly changes. To be more specific in terms of values, when $V_F = 2$ V, $R_l = 1$ kΩ, and $R_L = 300$ Ω, the following can be obtained from the equation (3).

When $V_{CC} = 5$ V, $I_F = 2.31$ mA, and
when $V_{CC} = 24$ V, $I_F = 16.9$ mA.

Thus, when the power supply voltage $V_{CC}$ increase about five-fold, the current $I_F$ varies about seven-fold.

As described, when the power supply voltage used is high, the current $I_F$ becomes still higher, putting too much load on the LED. As a result, the characteristics of the LED are likely to deteriorate. On the other hand, when the power supply voltage is low, the current $I_F$ becomes still lower, weakening the optical coupling between the LED and the photo-diode. As a result, detection of an object cannot be effectively performed.

SUMMARY OF THE INVENTION

The present invention has been proposed in consideration of the above, and a purpose thereof is to provide an object detector which can operate by an expanded range of the power supply voltage used.

Another purpose of the invention is to provide an object detector in which an appropriate level of a constant forward direction current is allowed to flow through the light emitting element of the detector.

Another purpose thereof is to provide an object detector in which the characteristics of the light emitting element can be prevented from deteriorating by decreasing the load put on the element when the power supply voltage is high, whereas an accurate detection can be ensured by strengthen the optical coupling between the light emitting element and photodetector when the power supply voltage is low.

The above-mentioned purposes can be achieved by an object detector comprising a first terminal to which a power supply voltage is applied, a second terminal for outputting an output signal, a light emitting element, connected to the first terminal, for emitting light, a photodetector, optically coupled with the light emitting element, for converting a light signal into an electrical signal, a switch connected between the light emitting element and the second terminal so as to operate in response to the electrical signal detected by the photodetector, and a constant current circuit connected between the light emitting element and the second terminal for allowing a current having a constant level to flow into the light emitting element.

According to the above structure, a constant current circuit is provided between the light emitting element and the second terminal (output terminal) for allowing a constant forward direction current into the light emitting element, and with this circuit, a constant light emitting output can be obtained regardless of the level of the power supply voltage. Consequently, the range of the power supply voltage used can be widened. Further, the characteristics of the light emitting element is prevented from deteriorating because the load put on the light emitting element can be driven when the power supply voltage is high, and a stable detecting operation can be carried out because a constant current is supplied to the light emitting element if the power supply voltage is low.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
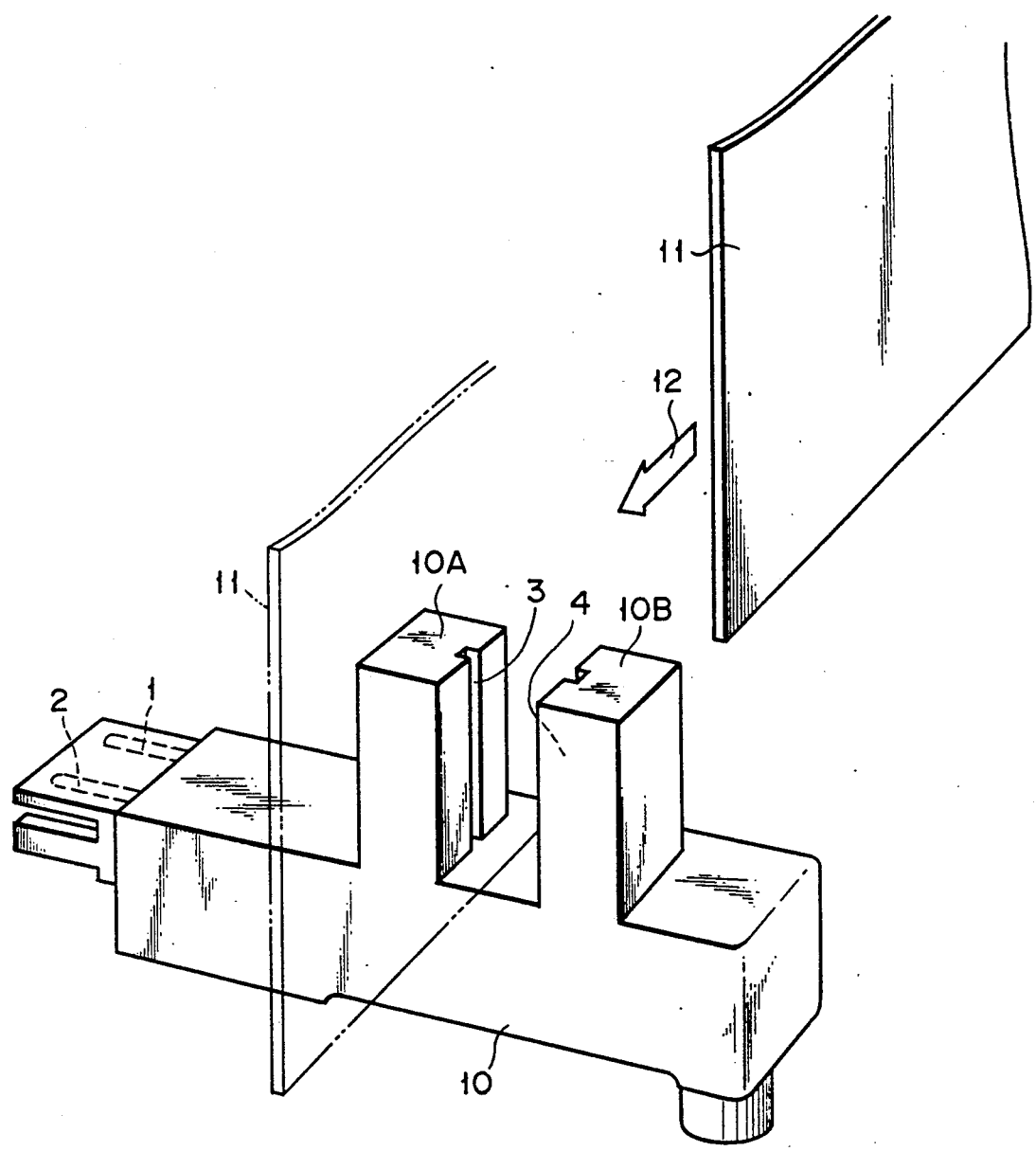
FIG. 1 is a diagonal view of a photo-interrupter designed as an example of the object detector according to the first embodiment of the present invention.

FIG. 1 shows the appearance of a photo-interrupter designed as an example of an object detector according to the first embodiment of the present invention. As can be seen in this figure, a package 10 has the first terminal 1 to which a power supply voltage $V_{CC}$ is applied, and the second terminal 2 through which an output signal $V_0$ is obtained. A light emitting diode (LED) 3 and a photo-diode 4 are arranged in column-like projections 10A and 10B of the package 10, respectively, such that they face each other. The photo-diode 4 is arranged such that it can receive light emitted from the LED 3, in other words, the LED 3 and the photo-diode 4 are optically coupled with each other. When an object 11 such as a piece of paper moves as indicated by the arrow 12 and is inserted between the projections 10A and 10B as illustrated by the broken lines, the optical coupling between the LED 3 and the photo-diode 4 is shut down, and thus the object 11 is detected. In addition, in the package 10, molded also are an amplifying circuit, an NPN transistor, a constant current circuit, though they are not shown.

Figure 2:
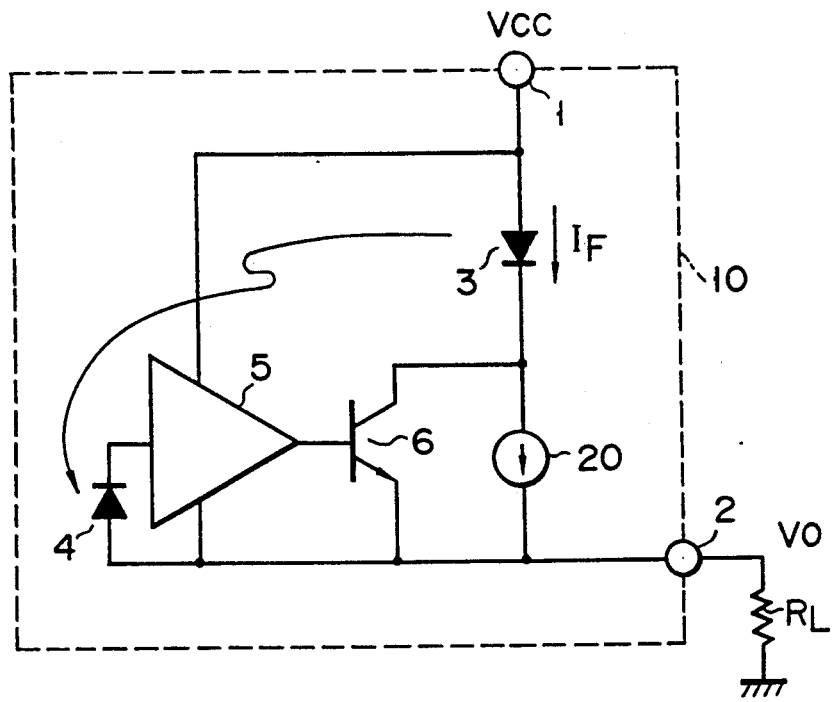
FIG. 2 is a diagram of a circuit structure of the photo interrupter shown in FIG. 1.

FIG. 2 shows the circuit structure of the photo-interrupter shown in FIG. 1. As can be seen in this figure, the anode of the LED 3 is connected to the first terminal 1 to which the power supply voltage $V_{CC}$ is applied. A constant current circuit 20 is provided between the cathode of the LED 3 and the second terminal 2. To the cathode of the LED 3, connected is the emitter of an NPN transistor 6, and to the second terminal 2, connected is the emitter of the NPN transistor 6. The photo-diode 4 is, as described above, optically coupled with the LED 3, and the second terminal 2 and the input terminal of the amplifying circuit 5 are connected to the anode and cathode of the photo-diode 4, respectively. Further, the first and second power terminals of the amplifying circuit 5 are connected to the first and second terminals 1 and 2, respectively. Lastly, the base of the NPN transistor 6 is connected to the output terminal of the amplifying circuit 5.

Figure 3:
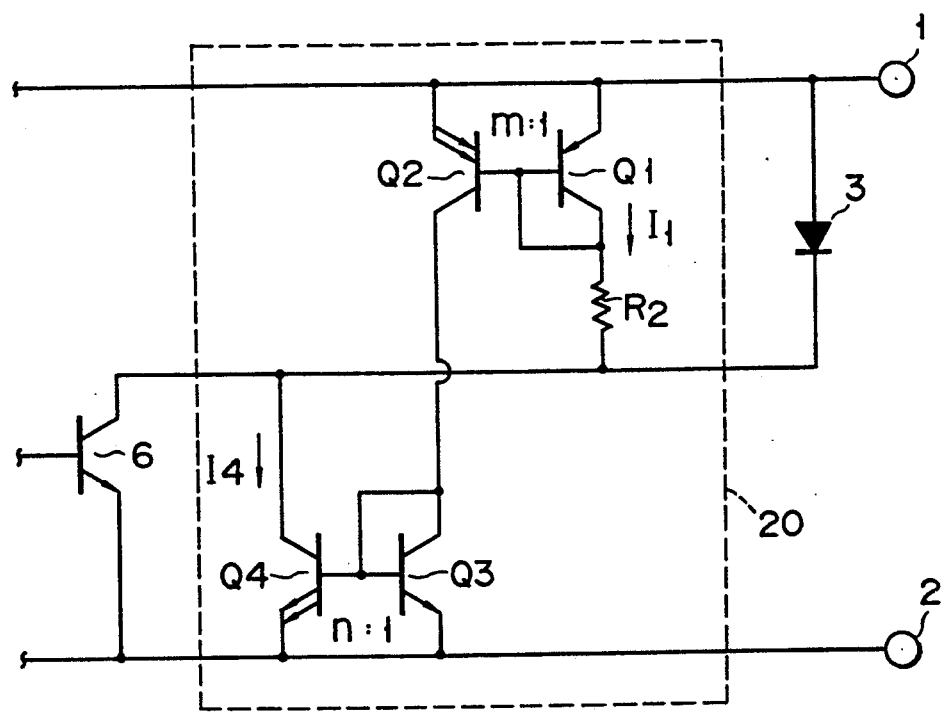
FIG. 3 is a diagram showing an actual structure of a constant current circuit employed in the circuit shown in FIG. 2.

FIG. 3 shows a structure of the constant current circuit 20 in the circuit shown in FIG. 2. This constant current circuit 20 includes PNP transistors Q1 and Q2 constituting the first current mirror circuit, and NPN transistors Q3 and Q4 constituting the second current mirror circuit. The emitter of the transistor Q1 is connected to the first terminal 1, the base thereof is connected to the base of the transistor Q2, and collector thereof is connected to one end of a resistor $R_2$ and a common connection point of the bases of the transistors Q1 and Q2. The other end of the resistor $R_2$ is connected to the cathode of the LED 3 and the collector of the transistor 6. The emitter of the transistor Q2 is connected to the first terminal 1, and the collector thereof is connected to the collector of the transistor Q3 and bases of the transistors Q3 and Q4. The emitter of the transistor Q3 is connected to the second terminal 2. The collector of the transistor Q4 is connected to cathode of the LED 3 and the collector of the transistor 6, and the emitter thereof is connected to the second terminal 2.

With the constant current circuit 20 shown in FIG. 3, a current Il flowing between the emitter and collector of the transistor Q1 is expressed as:

$$I_1 = (V_F - V_{BE})/R_2 \tag{4}$$

where a voltage between the base and emitter of the transistor Q1 is represented by VBE. The current $I_1$ is a reference current, and is determined by the forward direction voltage $V_F$ of the LED 3.

In the meantime, each pair of the transistors Q1 and Q2, and the transistors Q3 and Q4 constitutes a current mirror circuit. According to this structure, a current $I_4$ flowing through the transistor Q4 is expressed as:

$$\begin{aligned} I_4 &= m \times n \times I_1 \\ &= m \cdot n \cdot (V_F - V_{BE})/R_2 \end{aligned} \tag{5}$$

where the emitter area ratio of the transistor Q2 to Q1, and that of the transistor Q4 to Q3 are represented by "m:1" and "n:1", respectively, and when current amplifying efficiency hFE of the transistors are greater than the emitter area ratios m and n. As can be seen from the equation (5), with this structure, the current $I_4$, which is constant and independent from the power supply voltage $V_{CC}$, is allowed to flow to the LED 3.

In the circuit shown in FIG. 3, the forward direction current $V_F$ of the LED 3 is used as a reference voltage source for determining the reference current $I_l$ of the constant current circuit 20; therefore the structure of the circuit can be simplified, and consumption current can be very much saved.

The following are explanations of operations of the circuits shown in FIGS. 2 and 3.

In the case where the above-described photo-interrupter is used, a load resistor $R_L$ (external resistor) is connected between the second terminal 2 and the ground GND, which is outside the device, and the power supply voltage $V_{CC}$ is applied to the first terminal 1, thereby supplying a driving current to the LED 3 to emit light. The photo-diode 4 photoelectrically converts the light emitted from the LED 3 into an electrical signal, and outputs the thus converted current signal to the amplifying circuit 5. The current signal amplified in this circuit 5 is then output to the NPN transistor 6 so that the transistor 6 carries out ON/OFF operations in accordance therewith.

Meanwhile, in the case where there is no object in the optical path running from the LED 3 to the photo-diode 4 (i.e., a case where light is detected by the photo-diode 4), a current signal is output from the photo-diode 4. This current signal is amplified by the amplifying circuit 5, and is then supplied to the base of the NPN transistor 6. Thus, the NPN transistor 6 is turned on when a sufficient current is supplied to the base thereof, and is saturated between the collector and emitter. Here, when a saturated voltage between the collector and emitter, and a forward direction voltage of the LED 3 are represented by $V_{CE}$ (sat), and $V_F$, respectively, an output voltage $V_0$ of the second terminal 2 is expressed as:

$$V_0 = V_{CC} - V_F - V_{CE}(sat) \tag{6}$$

On the other hand, in the case where there is an object 11 in the optical path running from the LED 3 to the photo-diode 4 (i.e., a case where the LED 3 toward the photo-diode 4 is obstructed by the object 11, and therefore the light is not detected by the photo-diode 4), no current signal is output from the photo-diode 4, thereby turning off the NPN transistor 6. Consequently, the current $I_F$ flowing through the LED 3 is allowed to flow further out to the ground GND via the constant current circuit 20 and load resistor $R_L$. Here, the output voltage $V_0$ is expressed as:

$$V_0 = I_4 \times R_L \tag{7}$$

As can be understood from the above equations (6) and (7), the output voltages $V_0$ obtained by these equations differs from the case where there is an object 11 between the LED 3 and photo-diode 4, to the other case, where there is not an object. According to these different output voltages $V_0$ obtained at the second terminal 2, whether or not there is an object between the LED 3 and the photo-diode 4 can be detected. It should be noted here that the current $I_4$ is independent from the power supply voltage $V_{CC}$; therefore a constant current $I_F$ flows into the LED 3 regardless of variance of the power supply voltage $V_{CC}$, and a constant light output can be obtained.

To summarize, the constant current circuit 20 provided between the cathode of the LED 3 and the second terminal 2 permits an appropriate constant forward direction current $I_F$ to flow into the LED 3 regardless of the values of power supply voltages $V_{CC}$ (when $V_{CC} \geq V_F + V_{CE}$ (sat)), thereby obtaining a constant light output. Thus, the range of the power supply voltage $V_{CC}$ can be widened. Further, if the power supply voltage $V_{CC}$ is high, the load applied to the LED 3 can be reduced, and therefore deterioration of the LED 3 in terms of its characteristics can be prevented, whereas even if the voltage is low, a constant current is supplied to the LED 3, thereby stabilizing the detecting operation.

Figure 4:
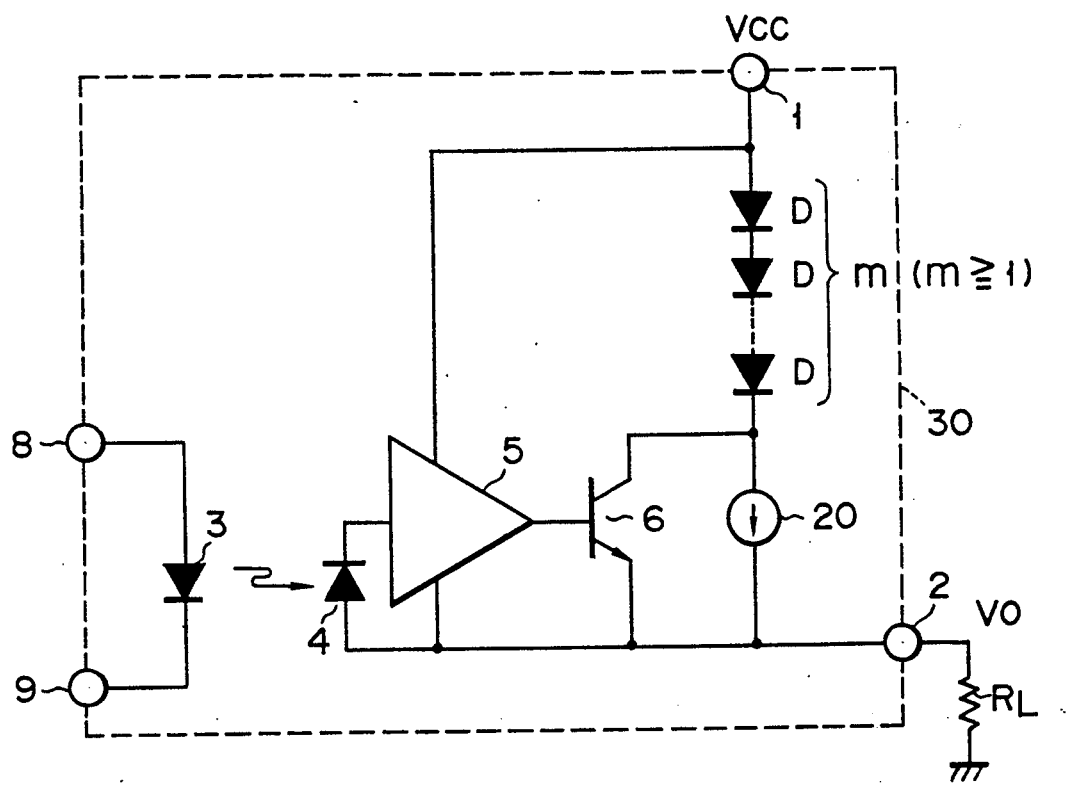
FIG. 4 is a diagram of another circuit structure of the photo-interrupter shown in FIG. 1, as another example of the object detector according to the second embodiment of the invention.

FIG. 4 shows a four-terminal type photo-interrupter as an example of an object detector according to the second embodiment of the present invention. This photo-interrupter has a structure in which the light emitting element side and photodetector side are electrically separated from each other, and thus it differs from the circuit 2 shown in FIG. 2. More specifically, the anode of an LED 3 is connected to a terminal 8, and the cathode thereof is connected to a terminal 9. A driving current is supplied to these terminals 8 and 9 to drive the LED 3. Further, there is at least one diode D provided between the terminal 1 and the constant current circuit 20. Except for the above-mentioned structure, the circuit of this figure is the same as that of FIG. 2.

Usage and operation of the 4-terminal type photo-interrupter 30 are basically the same as those of the two-terminal type photo-interrupter 10. Since the photo-interrupter 30 can drive the LED 3 independently of the others, the maximum value of the output voltage $V_0$ is expressed as:

$$V_0 = V_{CC} - V_F' - V_{CE}(sat) \tag{8}$$

where the forward direction voltage at the group of the diodes D is represented by $V_F'$. The output voltage $V_0$ of the above-mentioned two-terminal type photo-interrupter 10 depends only on the forward direction voltage $V_F$ of the LED 3, whereas the maximum possible value of the output voltage $V_0$ of the above four-terminal type photo-interrupter 30 can be varied as the forward direction voltage $V_F'$ is varied by changing the number of the diodes D connected under a condition that the amplifying circuit 5 operates on the voltage of "$V_F' - V_{CE}$ (sat)".

The following is an example of a comparison between the two-terminal and four-terminal type photo-interrupters 10 and 30 with specific numerical values.

Here, suppose that in the two-terminal type photo-interrupter 10 mentioned above, the forward direction voltage $V_F$ of the LED 3, and the saturated voltage $V_{CE}(sat)$ between the collector and emitter are 2 V and 0 V, respectively. In this case, when the power supply voltage $V_{CC}$ is 5 V, for example, the maximum value of the output voltage $V_0$ is automatically determined as 3 V. In contrast, suppose that in the four-terminal type photo-interrupter 30, the forward direction of each of the diodes D is 0.7 V (silicon diodes are used). In this case, when there is one diode D, the maximum value of the output voltage $V_0$ is 4.3 V, and where there are two diodes D, the maximum value is 3.6 V.

It should be noted that the present invention is not limited to the embodiments described above, and can be remodeled into a variety of modes as long as the essence of the invention remains. For example, the first and second embodiments are directed to photo-interrupters as examples of the object detectors; however, the present invention is applicable to other devices with which detection is an object performed using a light emitting element and photodetector optically coupled with each other. Further, in these embodiments, detection of an object is based on whether or not the object obstructs the optical path running from the light emitting element to the photodetector; however, if a highly reflective object is used, detection of the object can be carried out by judging whether or not the photodetector receives the light emitted from the light emitting element and reflected from the object. Furthermore, not only for detection of an object, the present invention can also be applied but also to an optical coupling detecting device for detecting whether or not a light emitting element and a photodetector are optically coupled.

In connection with a variety of modes of the invention, the polarity of each of the transistors, and the polarity of the power employed in the above embodiments can be reversed, and field effect transistors can be employed in place of the bipolar transistors.

Further, usage of the photo-interrupters 10 and 30 set forth in the embodiments is not limited to that disclosed. For example, the external resistor $R_L$ can be connected to the first terminal 1 (power terminal), and the second terminal 2 (output terminal) can be grounded so as to reverse the logic level of the output voltage $V_0$.

What is claimed is:

1. An object detector comprising:
   a first terminal to which a power supply voltage is applied;
   a second terminal for outputting an output signal;
   light emitting means, connected to said first terminal, for emitting light;
   photodetector means, optically coupled with said light emitting means, for converting a light signal into an electrical signal, said photodetector means being connected to said second terminal;
   switching means connected between said light emitting means and said second terminal so as to operate in response to said electrical signal detected by said photodetector means; and
   constant current means connected between said light emitting means and said second terminal for allowing a current having a constant level to flow into said light emitting means, said constant current means including a first polarity type first transistor having an emitter connected to said first terminal, a first polarity type second transistor having an emitter connected to said first terminal and a base connected to a base and a collector of said first transistor, a resistor having an end connected to the collector of said first transistor and an other end connected to a connecting point of said light emitting means and said switching means, a second polarity type third transistor having an emitter connected to said second terminal and a collector connected to a collector of said second transistor, and a second polarity type fourth transistor having an emitter connected to said second terminal and a base connected to a base and the collector of said third transistor, so as to generate a constant current using a forward direction voltage of said light emitting means as a reference voltage.

2. An object detector according to claim 1, further comprising a package in which said light emitting means, said photodetector means, said switching means, and said constant current means are sealed, wherein said first and second terminals are lead out said package to serve as external terminals.

3. An object detector according to claim 2, further comprising an external load resistor connected between said first terminal and a ground.

4. An object detector according to claim 1, further comprising amplifying means for amplifying the electrical signal output from said photodetector means and supplying it to said switching means.

5. An object detector according to claim 4, wherein said first and second terminals are connected to first and second power supply terminals of said amplifying means, respectively.

6. An object detector according to claim 1, wherein said constant current means handles a forward direction voltage of said light emitting means as a reference voltage source so as to generate a constant current.

7. An object detector according to claim 6, wherein said constant current means includes first and second current mirror circuits.

8. An object detector according to claim 1, wherein said constant current means includes a PNP type first transistor an emitter of which is connected to said first terminal, a PNP type second transistor an emitter of which is connected to said first terminal, and a base of which is connected to a base and a collector of said first transistor, a resistor an end of which is connected to the collector of said first transistor, and an other of which is connected to a connecting point of said light emitting means and said switching means, a PNP type third transistor an emitter of which is connected to said second terminal, a collector of which is connected to a collector of said second transistor, and a PNP type forth transistor an emitter of which is connected to said second terminal, a base of which is connected to a base and the collector of said third transistor.

9. An object detector comprising:
   first and second terminals to which driving currents are applied;
   light emitting means, connected between said first and second terminals, for emitting light by means of supply of said driving currents;
   photodetector means, optically coupled with said light emitting means, for converting a light signal into an electrical signal, said photodetector means being connected to said second terminal;

a third terminal to which a power supply voltage is applied;

a fourth terminal for outputting an output signal;

reference voltage generating means, connected to said third terminal, for generating a reference voltage;

switching means connected between said reference voltage generating means and said second terminal so as to operate in response to the electrical signal detected by said photodetector means; and constant current means connected between said reference voltage generating means and said second terminal for allowing a current having a constant level to flow therethrough, said constant current means including a first polarity type first transistor having an emitter connected to said first terminal, a first polarity type second transistor having an emitter connected to said first terminal and a base connected to a base and a collector of said first transistor, a resistor having an end connected to the collector of said first transistor and an other end connected to a connecting point of said light emitting means and said switching means, a second polarity type third transistor having an emitter connected to said second terminal and a collector connected to a collector of said second transistor, and a second polarity type fourth transistor having an emitter connected to said second terminal and a base connected to a base and the collector of said third transistor, so as to generate a constant current using a forward direction voltage of said light emitting means as a reference voltage.

10. An object detector according to claim 9, further comprising a package in which said light emitting means, said photodetector means, said switching means, said reference voltage generating means, and said constant current means are sealed, wherein said first to fourth terminals are lead out said package to serve as external terminals.

11. An object detector according to claim 10, further comprising an external load resistor connected between said fourth terminal and a ground.

12. An object detector according to claim 9, further comprising amplifying means for amplifying the electrical signal output from said photodetector means and supplying it to said switching means.

13. An object detector according to claim 12, wherein said third and fourth terminals are connected to first and second power supply terminals of said amplifying means, respectively.

14. An object detector according to claim 9, wherein said reference voltage generating means includes at least one diode.

* * * * *